United States Patent [19]

Rose, Jr.

[11] Patent Number: 4,957,205

[45] Date of Patent: Sep. 18, 1990

[54] COMPUTER DISK HOLDER

[76] Inventor: Robert D. Rose, Jr., 2635 S. Santa Fe Dr., Denver, Colo. 80223

[21] Appl. No.: 311,713

[22] Filed: Feb. 16, 1989

[51] Int. Cl.⁵ .............................................. B65D 85/57
[52] U.S. Cl. .................................... 206/444; 206/425; 206/472
[58] Field of Search ................ 206/307, 309, 311–313, 206/387, 425, 444, 472

[56] References Cited

U.S. PATENT DOCUMENTS

| | | | |
|---|---|---|---|
| 4,253,567 | 3/1981 | Goldammer | 206/387 |
| 4,533,049 | 8/1985 | Ozeki | 206/455 |
| 4,676,374 | 6/1987 | Wilkins | 206/444 |
| 4,687,226 | 8/1987 | Rose, Jr. | |
| 4,691,826 | 9/1987 | Ozeki | 206/454 |
| 4,724,956 | 2/1988 | Ozeki | 206/444 |
| 4,765,462 | 8/1988 | Rose, Jr. | |
| 4,776,457 | 10/1988 | Ferraroni | 206/444 |
| 4,793,477 | 12/1988 | Manning et al. | 206/444 |
| 4,823,950 | 4/1989 | Roze | 206/387 |
| 4,860,897 | 8/1989 | Fowler | 206/444 |

Primary Examiner—Jimmy G. Foster
Attorney, Agent, or Firm—Gregg I. Anderson; Ralph F. Crandell

[57] ABSTRACT

A computer disk holder for disks of the three and one-half inch format attachable to a three-ring notebook with snap rings is disclosed. The disk holder includes a frame of relatively rigid plastic having tabs formed along an edge thereof so that the disk holder can function as a page flipper for documentation when connected into the notebook. Disks are inserted into the disk holder along guide means and received by retention means. Bias means are biased as the disk is inserted into a compartment of the disk holder defined in part by the guide means. Once the bias means are biased, the disk is held in place by the retention means and the bias means.

18 Claims, 4 Drawing Sheets

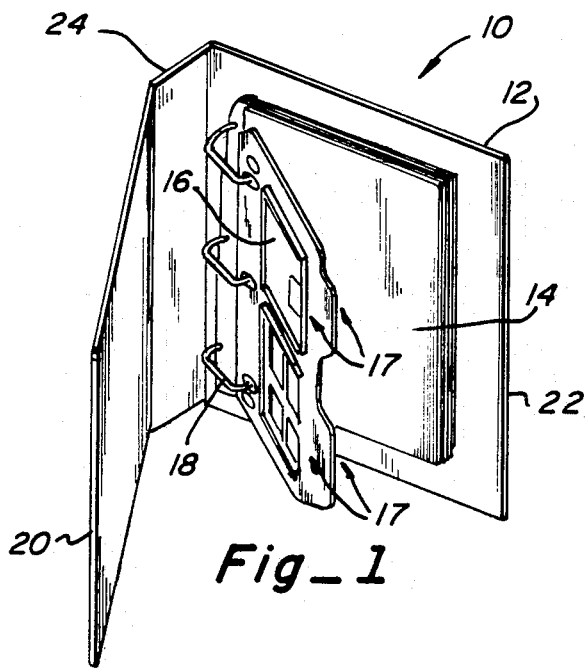
Fig_1
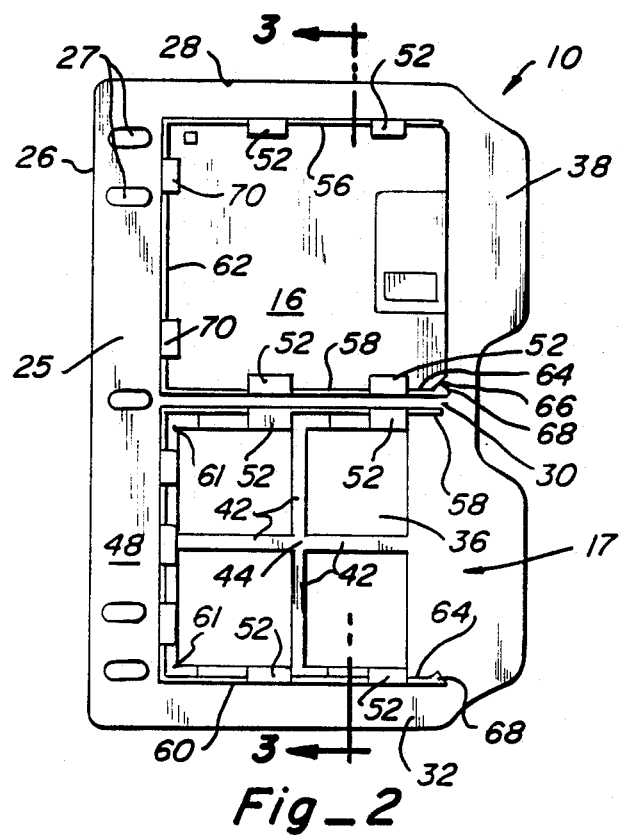
Fig_2
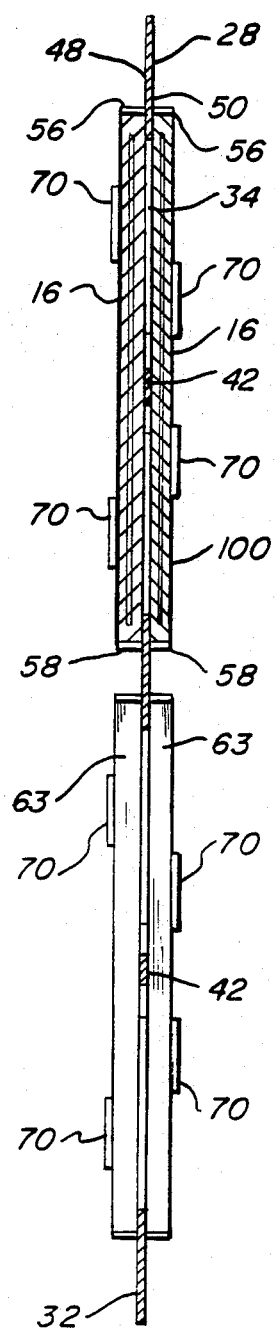
Fig_3

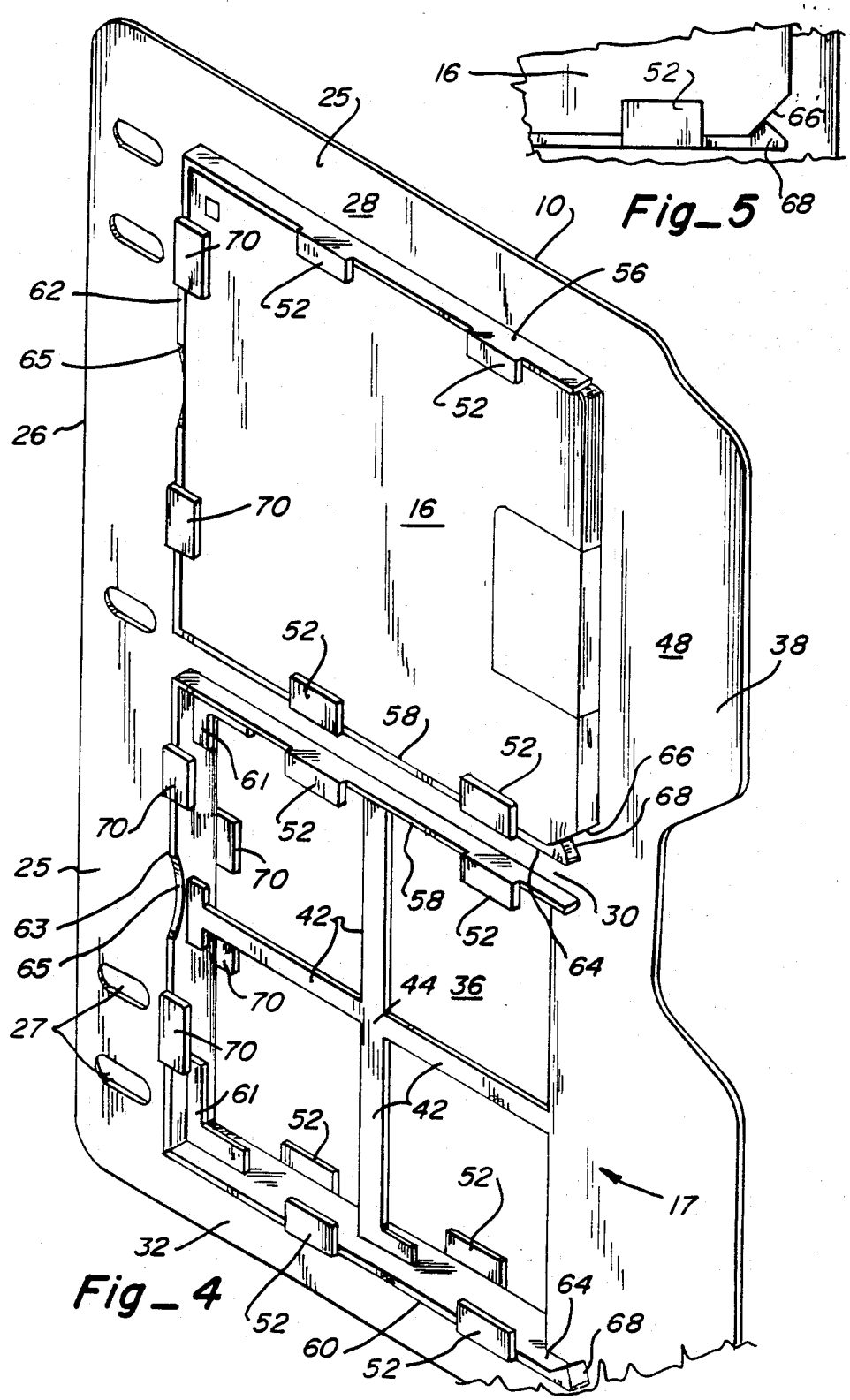

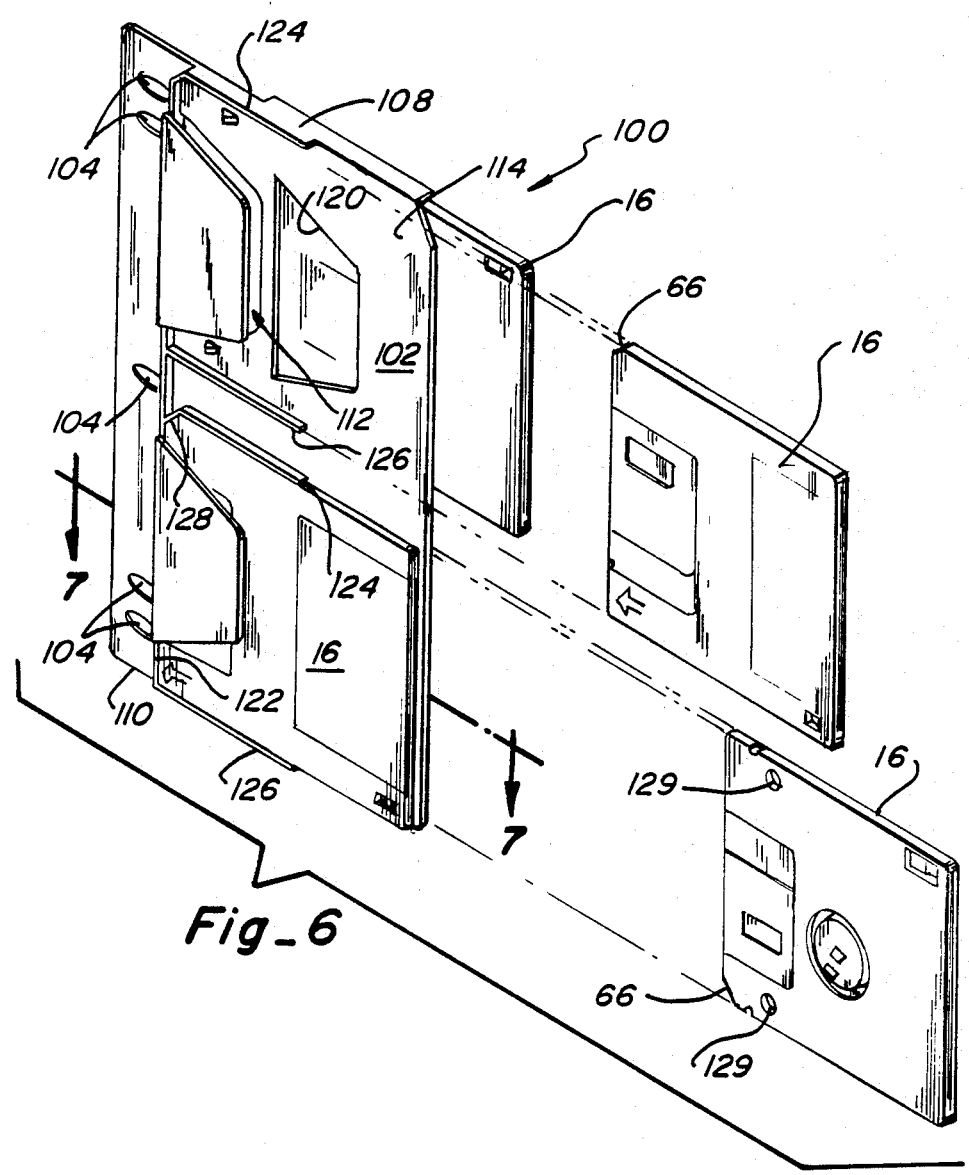
Fig_6
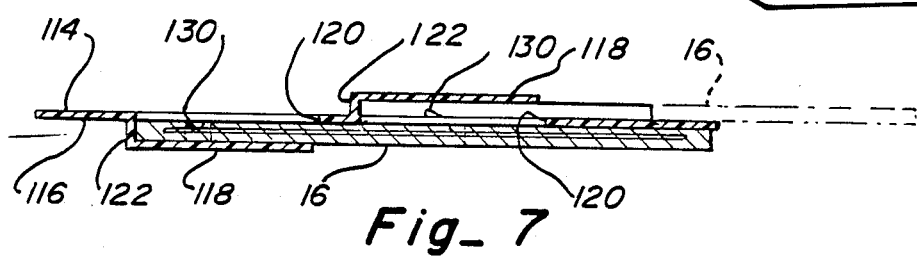
Fig_7

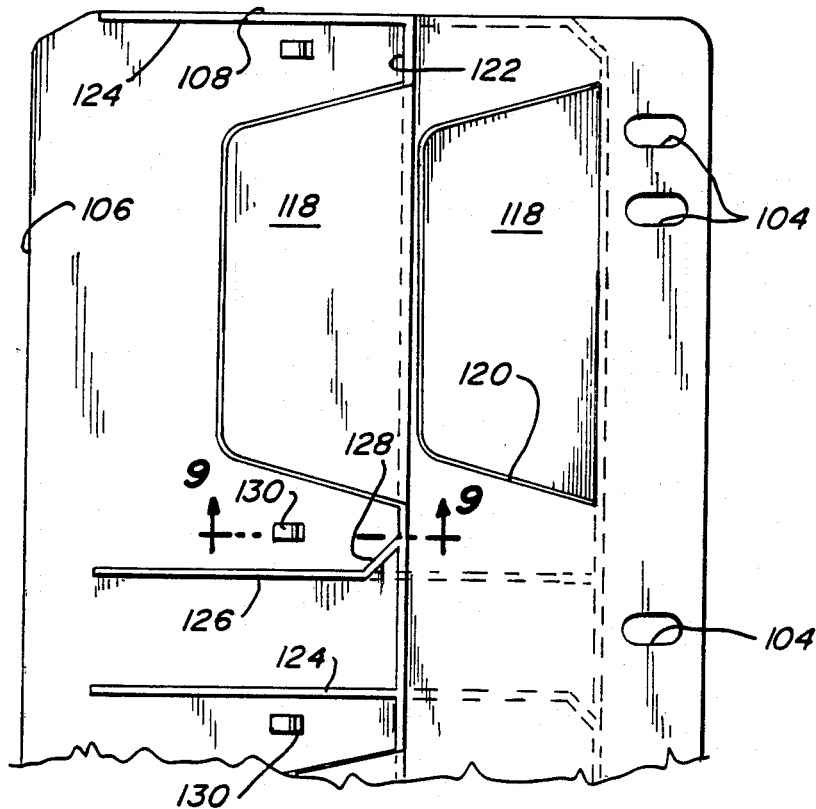
Fig_8
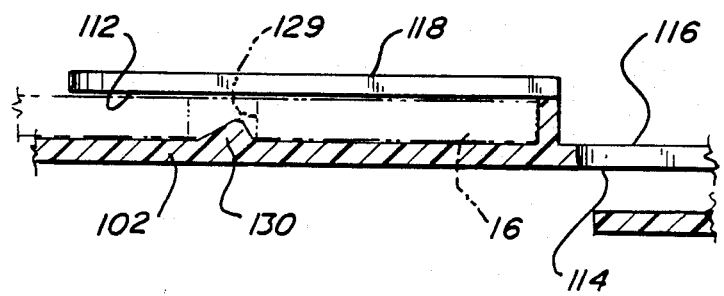
Fig_9

# COMPUTER DISK HOLDER

FIELD OF THE INVENTION

The present invention relates to computer disk holders for three and one-half inch format computer disks. More particular by, the invention relates to computer disk holders that can be inserted into three-ring loose-leaf notebooks.

DESCRIPTION OF THE PRIOR ART

The three and one-half diskette format, first introduced for Macintosh computers made by Apple Computer, Inc., has achieved widespread acceptance. Heretofore, the only means for storing such disks in notebooks, along with the documentation supporting any computer program contained on the disk, is a polyethylene plastic sleeve into which the disk is inserted. Such sleeves typically store only two disks.

The prior art sleeves are flexible and nonrigid and, therefore, cannot be used as a page flipper or turner. The prior art is somewhat cumbersome to use in order to insert and remove a disk from the sleeves or envelopes.

The use of loose-leaf notebooks to store comPuter programs including both the disk and support documentation is known from U.S. Pat. No. 4,765,462, issued to Robert D. Rose, Jr., the inventor herein. A support device for such a notebook is shown in U.S. Pat. No. 4,687,226, also issued to Robert D. Rose, Jr.

SUMMARY OF THE INVENTION

It is the principal object of the present invention to provide a computer disk holder for three and one-half inch format computer disks.

It is a related object of the present invention to provide a computer disk holder for computer disks which can be inserted into a loose-leaf notebook and assist in flipping or turning documentation pages.

It is a further related object of the present invention to provide a computer disk holder for computer disks into which disk holder the disks are easily inserted or loaded and removed.

In accordance with the objects of the present invention, a computer disk holder includes a rigid frame with holes therein to receive snap rings of a loose-leaf notebook, which notebook also stores documentation for any computer program on the disk. The disk holder includes top and bottom storage racks or compartments, each of which racks positions and levels a three and one-half inch format computer disk.

The frame includes, at one longitudinal side thereof, holes for receiving snap rings of the notebook. The opposite longitudinal side thereof has integral tabs formed at the edge thereof, which tabs may be used to flip or turn the disk holder and pages of documentation that may rest there-against.

Each of the top and bottom racks includes top and bottom guiderails extending perpendicularly away from the frame and on both front and back surfaces thereof to receive and guide the disks into the disk holder. A first edge of the disk engages a vertical stop member, positioning the disk between the top member and top and bottom guiderails of the rack. The disk forces bias member or spring element away from the frame as the disk is inserted, said spring element releaseably engages or retains the disk. The disk is secured in place by the top member, spring element and the guiderails. Removal of the disk is accomplished and overcoming the bias of the spring element, releasing the engagement with the disk.

Other aspects, features and details of the present invention can be more completely understood by reference to the following detailed description of the preferred embodiment, taken in conjunction with the drawings, and from the appended claims.

BRIEF DESCRIPTION OF THE DRAWINGS

FIG. 1 is a perspective view of a first embodiment of a disk holder connected to a notebook for storing software documentation.

FIG. 2 is a front elevational view of the disk holder shown in FIG. 1.

FIG. 3 is a sectional view taken along line 3—3 of FIG. 2.

FIG. 4 is an enlarged perspective view of the first embodiment of the disk holder and a computer disk.

FIG. 5 is an enlarged fragmentary view of the spring member of the first embodiment of the disk holder.

FIG. 6 is an exploded perspective view of a second embodiment of a disk holder, computer disks shown prior to insertion.

FIG. 7 is a sectional view taken along line 7—7 of FIG. 6.

FIG. 8 is a fragmentary plan view of the second embodiment shown in FIG. 6.

FIG. 9 is an enlarged fragmentary sectional view of the second embodiment shown in FIG. 6, the computer disk shown inserted in phantom line.

DESCRIPTION OF THE PREFERRED EMBODIMENT

A first embodiment of a disk holder 10 is shown in FIGS. 1-5. In FIG. 1, the disk holder 10 is connected to snap rings 18 of a loose-leaf notebook 12. The snap rings 18 also retain documentation 14 for a computer program contained on computer disks 16 in the three and one-half inch format, used principally in Macintosh computers manufactured by Apple Computer, Inc. The notebook 12 includes a front cover 20, back cover 22 and spine 24, each flexibly connected together along hinge lines.

The disks 16 are releasably secured into four storage racks or compartments 17 of the disk holder 10. Each of the compartments 17 holds one of the disks 16. The disk holder 10 is made of rigid, but lightweight, plastic. The disk holder 10 acts as a page flipper or turner for the documentation 14 as well as a storage device for releasably securing the disks 16. The disks 16 are slid into the disk holder 10 and releasably retained in a spring-biased manner for quick loading and unloading from the disk holder 10.

The disk holder 10 includes a relatively rigid plastic frame 25. The frame 25 has a longitudinal ring member 26 having elongated ring holes 27 formed therein for receipt of the snap rings 18. A longitudinal tab member 38 of the frame 25 extends parallel to the ring member 26 and has integral tabs 40 formed at an edge to facilitate page flipping. The ring member 26 is connected to the tab member 38 by an integrally-formed transverse top member 28, transverse middle member 30, and transverse bottom member 32. A top opening 34 is defined between the ring member 26, the tab member 38, the transverse top member 28 and the transverse middle member 30. In like manner, a bottom opening 36 is formed between the ring member 28, the tab member 38, the transverse middle member 30 and the transverse bottom member 32.

Each of the top and bottom openings 34 and 36 has cross-members 42 extending thereacross intersecting at a center 44, separating the openings 34 and 36 to define the compartments 17. The frame 25 has a front surface 48 and a back surface 50. (FIG. 3). The disk holder 10 holds two disks 16 in two of the compartments 17 on each of the surfaces 48 and 50, one disk 16 on either side of the top and bottom openings 34 and 36 for a total of four disks 16, one in each of the compartments 17. In use, the disks 16 are placed in the compartments 17 on either side of the cross-members 42 so that a total of four disks 16 can be held and stored in the disk holder 10.

The disks 16 are inserted into the compartments 17 from right to left, with reference to FIGS. 2 and 4. A first edge of the disk 16 is inserted under first retainers 52. The first retainers 52 are members of inverted L shape, extending perpendicularly away from a top guiderail 56 and two middle guiderails 50. The guiderails 56 and 58 perpendicularly intersect the front and back surfaces 48 and 50. The retainers 52 project into the top and bottom openings 34 and 36. (FIG. 2).

The top guiderail 56 and the middle guiderail 58 on the front surface 48 define guide means for aligning the disk 16 for insertion under the first retainers 52 and into a position in one of the compartments 17 registered with the top opening 34. The guiderails 56 and 58 guide the disk 16 into alignment under the first retainers 52 and over the top opening 34. In like manner, the middle guiderail 58 and bottom guiderail 60 on the front surface 48 direct the disk 16 into registered position over the bottom opening 36. The top guiderail 56 is integrally formed with the top transverse member 28. The middle guiderail 58 is integrally formed with the middle transverse member 30, and the bottom guiderail 60 is integrally formed with the bottom transverse member 32. Separators 61 at stop members 62 and 63 maintain the disk 16 in position over the openings 34 and 36 and, with the cross-members 42, divide the openings 34 and 36 into the compartments 17.

The first edge of the disk 16 abuts the stop member 62 formed on the front surface 48 associated with the top opening 34, as the disk 16 is inserted into the disk holder 10 and under the first retainers 52. The stop member 62 perpendicularly intersects the front surface 48 between the top and top middle guide rails 56 and 58. The like stop member 63 is formed on the front surface 48 extending between the middle and bottom guiderails 58 and 60. Each stop member 62 and 63 includes a thumb notch 65 to allow the disk 16 to be pushed away from the stop members 62 and 63 and out of the disk holder 10.

The bias of a bias member or spring element 64 acts in a plane parallel to the plane of the frame 25 and adjacent to the front and back surfaces 48 and 50. The first retainers 52 receive the disk 16 in the parallel plane as part of retention means for the disk 16. The spring element 64 is deflected as the disk 16 is loaded into the disk holder 10 under the first retainers 52 and between the guiderails 56 and 58 or 58 and 60. An opposing or second edge of the disk 16 includes an incline or ramp 66 which matingly engages a ratchet member 68 of the spring element 64. The spring element 64 is integrally formed with the top middle guiderail 58 and the bottom guide rail 60, like structure occurring on the back surface 50. The spring elements 64 are free to move relative to the disk holder 10 at the end near the ratchet 68. Second retainers 70 overlie the first edge of the disk 16 as it is abutted against the stop members 62 and 63, comprising part of the retention means with the first retainers 52. The second retainers 70 extend perpendicularly away from the stop members 62 and 63 into the openings 34 and 36 of the disk holder 10.

In operation, the disk holder 10, at one of the compartments 17 defined by the guiderails 56, 58 and 60 and the stop members 62 and 63, receives the first edge of the disk 16. The spring elements 64 associated with each of the compartments 17 is deflected as the disk 16 is inserted under the first retainers 52. As the disk 16 is slid fully into the compartment 17, the first edge of the disk 16 passes under the second retainers 70, the spring element 64 is deflected away until the ramp 66 of the disk 16 is adjacent the ratchet member 68, at which time the spring element 64 releasably locks the disk 16 into place. The force in the spring element 64 is sufficient so that merely inverting the disk holder 10 will not displace the disk 16. It is readily apparent, from the immediately foregoing, that the structure and operation of the disk holder 10 will be identical for the disks 16 mounted on either the front or back surfaces 48 and 50 or in the compartments 17 associated on either the top or bottom openings 34 and 36.

An alternative embodiment disk holder 100 is shown in FIGS. 6-9. The disk holder 100 includes a flat frame 102 having elongated ring holes 104 formed at one edge thereof and a tab edge 106 formed along a second edge thereof. The combination of the elongated ring holes 104 and the tab edge 106 allow the disk holder 100 to be used as a page flipper or turner, as was the case with the disk holder 10 of the first embodiment. The frame also includes a top edge 108 and a bottom edge 110. Four compartments 112 are formed integrally with the frame 102, two of the compartments 112 on each side of the frame 102, holding a total of four of the disks 16 (FIG. 6).

Two of the compartments 112 are located on a front surface 114 (FIGS. 6, 8, and 10), while two of the compartments are formed on a back surface 116 (FIG. 7). The front surface compartments 112 are vertically aligned closer to the tab edge 106, while the back surface compartments 112 are vertically aligned closer to the edge where the ring holes 104 are formed. In addition, the two compartments 112 nearer the top edge 108 are staggered relative to each other, as are the two compartments 112 located near the bottom edge 110. The staggering allows bias means 118 to be formed out of the frame 102, leaving mold openings 120 under each of the bias means 118. This conserves plastic material resulting in a lighter, less expensive disk holder 100.

Each of the bias means 118 is raised above the plane of the frame 102 and extends perpendicularly away from a stop member 122 toward the tab edge 106. Top guiderails 124 and bottom guiderails 126 bracket the disk 16 as it is inserted into the compartments 112, as in the first embodiment defining guide means for the disk 16. The guiderails 124 and 126 extend perpendicularly above the front and back surfaces 114 and 116 of the frame 102 at approximately a height equal to the width of the disk 16 (FIGS. 7 and 9). The stop member 122 is integrally connected to and extends between the guiderails 124 and 126. The stop member is the same height above the front and back surfaces 114 and 116 as the guiderails 124 and 126.

The bias means 118 is biased toward the respective front and back surfaces 114 and 116 so that the disk 16, as it is inserted, is retained, in part, by the spring bias nature of the bias means 118. The bias is achieved by forming the bias means 118 from the same plastic from which the frame 102 is formed. A flap of plastic from which the bias means 118 is formed is spaced from the frame 102 a distance less than the width of the disk 16, causing the disk 16 to bias the flap as the disk 16 is inserted. The disk 16 includes the ramp 66 described in reference to the first embodiment. At the intersection of the top guiderail 124 and the stop member 122, an integral mating surface 128 receives the ramp 66 (FIG. 8). This defines the direction in which the disk 16 is inserted into each of the compartments 112.

The disks 16 have detents 129 formed therein for mating connection to the computer on which the disk 16 is to be operated (FIGS. 6 and 9). In the disk holder 100, selectively positioned location and retention nipples 130 are formed on both of the front and back surfaces, near the bias means 118. The nipples 130 receive the detents 129 in the disk 16 in a ball and detent or snap connection. The disk 16 is held by the bias means 118 against the nipples 130 in a releasable connection. The nipples 130 are ramped in the direction of insertion into the disk holder 100. Upon removal, a more nearly vertical ramped surface must be overcome (FIG. 9). This geometry eases insertion of the disk 16 and makes it more difficult to remove the disk 16 once it is inserted.

In operation of the alternative embodiment disk holder 100, the disk 16 is inserted with the ramp 66 edge first into one of the compartments 112. The bias means 118 is deflected out of the way, and the disk 16 inserted to the stop member 122, guided during insertion by the guiderails 124 and 126. At the point where the disk 16 is totally inserted into the compartment 112, the detents 129 in the disk 16 receive the nipples 130. The spring bias of the bias means 118 is sufficient to hold the disk against front and back surfaces 114 and 116 and to maintain the nipples 130 in the detents 129 in the disk 116.

To remove the disk 16 from the disk holder 100, the opposite edge of the disk 16 from the ramp 66 is lifted away from the front or back surfaces 114 and 116, overcoming the bias in the bias means 118 and removing the holes in the disk 16 from engagement with the nipples 130. The disk 16 is then withdrawn for use with the computer.

It will be understood that in both embodiments of the disk holders 10 and 100, the documentation 14 is maintained in the looseleaf notebook 12, along with the disks 16 held in the disk holders 10 and 100. The documentation 14 is relatively easily turned by flipping the disk holders 10 and 100 while the disks 16 are maintained in a position near the documentation 14.

The present invention has been described with a certain degree of particularity. The described embodiment is to be considered in all respects only as illustrative, and not restrictive, and the scope of the invention is, therefore, indicated by the appended claims rather than the foregoing description.

I claim:

1. A disk holder for storing a plurality of computer disks in a snap ring loose-leaf notebook for storing documentation and said disk holder, said disk holder comprising in combination, a generally rectangular frame adapted to be retained in the notebook and having a front surface and a back surface, said rectangular frame including a longitudinal ring member to which said notebook snap rings connect, a longitudinal tab member extending parallel to and spaced from said ring member, said ring member and tab member being integrally joined by a transverse top member, a transverse middle member, and a transverse bottom member, said transverse members, ring member and tab member defining two compartments on each of said front and back surfaces, each said compartment having means for receiving and aligning a disk inserted therein, selected edges of said receiving means having tabs formed thereon defining means for retaining said disk in said compartment, means associated with said retaining means for contacting and biasing said disk against said retaining means whereby four disks, two mounted on either surface of said disk holder, can be held in said disk holder.

2. The disk holder as defined in claim 1 wherein said retaining means further includes nipples formed on said front and back surfaces for engaging corresponding holes formed in said disks.

3. The disk holder as defined in claim 2 wherein said biasing means includes a spring element which is integrally connected to a stop member, said spring element overlying said compartment and biasing each said disk against said nipples.

4. The disk holder as defined in claim 3 wherein said spring element is formed adjacent to an opening in said frame corresponding to the shape of said spring element.

5. The disk holder as defined in claim 4 wherein said guide means includes a pair of guide rails extending perpendicularly above said front and back surfaces and associated with said stop member, one of said guide rails and said stop members defining a mating surface for a ramp of said disk.

6. A disk holder for storing a plurality of computer disks in a snap ring loose-leaf notebook for storing documentation and said disk holder, said disk holder comprising, in combination, a generally rectangular frame adapted to be retained in the notebook and having a front surface and a back surface, said frame including parallel laterally extending spaced apart top, middle and bottom transverse members, parallel longitudinally extending spaced apart ring and tab members integral with said transverse members and defining therewith a top and a bottom opening on said front and back surfaces, and cross-members integral with said transverse members, ring and tab members extending across each of said openings, and each of said openings defining a compartment selectively registrable with a disk, each compartment having means for receiving and aligning a disk inserted therein, selected edges of said receiving means having tabs formed thereon defining means for retaining said disk in said compartment, and means associated with said retaining means for contacting and biasing said disk against said retaining means, whereby disks can be retained and stored on said front and back surfaces.

7. The disk holder as defined in claim 6 wherein said biasing means further includes a ratchet which engages a ramp portion of said disk whereby said biasing means is initially deflected upon insertion of said disk into said ratchet, and said ratchet matingly and lockingly engages said ramp when said disk is fully inserted into the compartment of said disk holder.

8. The disk holder as defined in claim 7 wherein said compartment includes means for accessing said disk and pushing said disk against the biasing means to remove said disk from said disk holder.

9. A disk holder for storing a plurality of disks in a snap ring looseleaf notebook for storing documentation and said disk holder, said disks defining spaced holes in one surface thereof, said disk holder comprising in combination, a generally rectangular frame adapted to be retained in the notebook and having a front surface and a back surface, each of said front and back surfaces defining at least one compartment having means for receiving and aligning a disk inserted therein, means on said front and back surfaces for releasably retaining said disk in said compartment of said disk holder, and means for releasably contacting said inserted disk and biasing said disk against said retaining means, said retaining means comprising nipples formed on said front and back surfaces for engaging in said holes formed in said disks.

10. The disk holder as defined in claim 9 wherein said biasing means includes a spring element which is integrally connected to a stop member, said spring element overlying said compartment and biasing said disk against said nipples.

11. The disk holder as defined in claim 10 wherein said spring element is integral with said frame adjacent to an opening in said frame corresponding to the shape of said spring element.

12. The disk holder as defined in claim 10 wherein said receiving means includes a pair of guide rails extending perpendicularly above said front and back surfaces and associated with said stop member, one of said guide rails and said stop member defining a mating surface for a ramp of said disk.

13. The disk holder as defined in claim 9 wherein each of said nipples defines a ramp surface extending in the direction of insertion and a shoulder facing in the direction in which the disk is withdrawn from the disk holder.

14. A disk holder for computer disks releasably connected to a loose-leaf notebook having snap rings for retaining documentation and said disk holder, comprising, in combination:

a generally rectangular frame having a front and a back surface and including a longitudinal ring member having elongated openings formed therein for connection to said snap rings of said notebook and an opposed parallel tab member having integral tabs projecting away therefrom, said ring member and said tab member interconnected by a transverse top member, a transverse middle member and a transverse bottom member, defining therebetween a top opening and a bottom opening in said frame;

a top guiderail, middle guiderail and bottom guiderail formed along said top, middle and bottom transverse members and on each of said front and back surfaces, defining guide means for guiding said disks into said disk holder;

first inverted L members integrally mounted to the front and back surfaces of said frame for retaining an edge of selected ones of said disks, said first L members mounted to each of said front and back surfaces along said guiderails;

second inverted L members integrally mounted to the front and back surfaces of said frame for retaining a second edge of selected ones of said disks, said second L members mounted to each of said front and back surfaces along a stop member; and bias means for engaging said disks mounted to the front and back surfaces of the frame and associated with each of said top and bottom openings near said first inverted L members, whereby said first inverted L members receive said edge of said disk as said disks engage said bias means and said second edge of said disk is received by said second inverted L members.

15. A disk holder for storing a plurality of computer disks, said disk holder releaseably connected to a loose-leaf notebook with snap rings for storing documentation and said disk holder, said disk holder comprising in combination:

a generally rectangular frame having a front surface and a back surface;

each of said front and back surfaces having guide means for receiving and aligning each of the disks as said disks are inserted into compartments of said frame;

nipples formed at preselected positions on said front and back surfaces for engaging holes in said disks upon said disks being fully inserted into said compartments; and bias means connected to said frame for contacting said disk and urging said disk into contact with said nipples.

16. The invention as defined in claim 15 wherein said compartment is further defined by a stop member, said stop member integrally connected to said bias means.

17. The invention as defined in claim 16 wherein said guide means further includes parallel extending guiderails integrally connected to said stop member defining therebetween said compartment.

18. The invention as defined in claim 17 wherein said bias member is registered over an opening of like shape formed in said frame.

* * * * *